US012111988B1

(12) United States Patent
Searle

(10) Patent No.: US 12,111,988 B1
(45) Date of Patent: Oct. 8, 2024

(54) ILLUMINATION ASSOCIATED WITH A TOUCH SENSITIVE AREA

(71) Applicant: Cirque Corporation, Sandy, UT (US)

(72) Inventor: Robert Searle, Riverton, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/369,903

(22) Filed: Sep. 19, 2023

(51) Int. Cl.
*G06F 3/038* (2013.01)
*G06F 3/044* (2006.01)
*H01H 13/83* (2006.01)

(52) U.S. Cl.
CPC .............. *G06F 3/038* (2013.01); *G06F 3/044* (2013.01); *H01H 13/83* (2013.01); *G06F 2203/04101* (2013.01)

(58) Field of Classification Search
CPC ..................... G06F 3/038; G06F 3/044; G06F 2203/04101; G06F 1/1692; G06F 3/0416; G06F 3/0412; G06F 3/0443; G06F 1/1684; G06F 1/1616; G06F 3/0418; G06F 3/0488; H01H 13/83; G01N 29/036
See application file for complete search history.

(56) References Cited

U.S. PATENT DOCUMENTS 6,927,384 B2 8/2005 Reime
7,733,334 B2 6/2010 Lu
8,106,786 B2 1/2012 Kim
8,602,623 B2 12/2013 Lin
2006/0289284 A1 12/2006 Han
2007/0285402 A1 12/2007 Lim
2009/0021492 A1 1/2009 Wu
2010/0134431 A1* 6/2010 Tsai ...................... G06F 3/0416 345/173
2010/0137033 A1* 6/2010 Lee ....................... G06F 1/1616 345/173
2011/0122092 A1 5/2011 Lu
2012/0162105 A1* 6/2012 Sakurai ................. G06F 3/0488 345/173
2012/0200531 A1* 8/2012 Araki .................... G06F 3/0418 345/174
2012/0306744 A1 12/2012 Hoffman
2014/0218337 A1* 8/2014 Yamaguchi ........... G06F 3/0443 345/174
2019/0073003 A1* 3/2019 Xu ........................ G06F 1/1692
2020/0104042 A1* 4/2020 Tsai ...................... G06F 1/1684
2021/0231615 A1* 7/2021 Munemoto .......... G01N 29/036
2024/0019983 A1* 1/2024 Lu ......................... G06F 3/0412

* cited by examiner

*Primary Examiner* — Richard J Hong

(57) ABSTRACT

An electronic device may include a touch sensitive area located within a cover; a first side of the cover within the touch sensitive area includes a capacitance reference surface; a capacitance sensor disposed near the second side of the cover at the touch sensitive area; a selectively illuminable light source disposed near the second side of the cover; a processor; memory in communication with the processor; programmed instructions that, when executed, cause the processor to receive a non-contact input from the capacitance sensor; and send an instruction to illuminate the selectively illuminable light source in response to the non-contact input where the selectively illuminable light source illuminates a feature in the capacitance reference surface where the non-contact input represents a proximity measurement that may be over one millimeter away from the cover.

18 Claims, 12 Drawing Sheets

ILLUMINATION ASSOCIATED WITH A TOUCH SENSITIVE AREA

FIELD OF THE DISCLOSURE

This disclosure relates generally to systems and methods for operating a touch sensitive area of an electronic device. In particular, this disclosure relates to systems and methods for identifying the touch sensitive area.

BACKGROUND

A touch pad is often incorporated into laptops and other devices to provide a mechanism for giving inputs to the device. For example, a touch pad may be positioned adjacent to a keyboard in a laptop and include a surface that can be touched by the user. Touch pads may operate using capacitive sensing, a technology that senses the change of capacitance where a finger touches the pad. In some examples, moving a finger, stylus, or another type of object on the touch pad may cause a cursor to move on a display in communication with the touch pad.

An example of a touch pad is disclosed in U.S. Patent Publication No. 2012/0306744 issued to Dustin L, Hoffman, et al. This reference discloses electronic device having a touchpad that illuminates.

Another example of a touch pad is disclosed in U.S. Pat. No. 7,733,334 issued to Ying-Ta Lu, et al. This reference discloses a hidden touch pad structure adapted for an electronic product has a plate, a touch pad arranged inside the plate, a circuit board disposed under and retained against the plate and the touch pad simultaneously, and a lighting device surrounding the touch pad and received inside the plate. The circuit board receives a pressure signal via the plate and the touch pad and drives the lighting device to provide light. The touch pad is recognized via the lighting device surrounding the touch pad.

Another example of a touch pad is disclosed in U.S. Patent Publication No. 2007/0285402 issued to Sang Yeon L I M, et al. This reference discloses a method for providing light feedback responsive to user contact with an input device includes receiving user contact at an input area associated with a touchpad that includes a plurality of regions, and identifying which region of the touchpad is associated with the user contact. The method further includes navigating items displayed on an associated display, which is separate from the input area, responsive to the user contact, and generating light responsive to the user contact from at least one light emitting device at a location proximately located to the user contact.

Another example of a touch pad is disclosed in U.S. Patent Publication No. 2011/0122092 issued to Kuo-Huang Lu, et al. This reference discloses an electronic device with an optical touch module is presented. A touch pad is disposed on the electronic device and at least one light transmission element is disposed on at least one side of the touch pad. The touch pad has a sensing area and senses a moving track direction of an object on the sensing area. Therefore, the touch pad, according to the moving track direction of the object, activates a light source to irradiate to the light transmission element corresponding to the moving track direction, such that the light transmission element illuminates on at least one side of the touch pad, thus achieving the effect of direction indication with light sources.

Each of these references are herein incorporated by reference for all that they disclose.

SUMMARY

In one embodiment, an electronic device may include a display; a cover connected to the display; a touch sensitive area located within the cover and spaced away from the display at a distance; a first side of the cover within the touch sensitive area includes a capacitance reference surface; a second side of the cover may be opposite the first side of the cover; a capacitance sensor disposed near the second side of the cover at the touch sensitive area; a selectively illuminable light source disposed near the second side of the cover; a processor; memory in communication with the processor; programmed instructions stored in the memory that, when executed, cause the processor to receive a non-contact input from the capacitance sensor; and send an instruction to illuminate the selectively illuminable light source in response to the non-contact input where the selectively illuminable light source illuminates a feature in the capacitance reference surface where the non-contact input represents a proximity measurement that may be over one millimeter away from the cover.

The feature may be a virtual key in the capacitance reference surface.

The feature may be at least a portion of border around at least a portion of the capacitance reference surface.

The non-contact input may represent a proximity measurement that may be over one inch away from the cover.

The non-contact input may represent a user approaching the capacitance reference surface at a distance range away from the capacitance reference surface without touching the capacitance reference surface.

The distance range may be less than eight inches away from the capacitance reference surface.

The distance range may be less than one inch away from the capacitance reference surface.

The selectively illuminable light source may be a light emitting diode.

The touch sensitive area may not be identified in the cover when the selectively illuminable light source may not be activated.

The touch sensitive may be identified when the selectively illuminable light source may be activated.

In some embodiments, an electronic device may include a cover; a keyboard located within the cover; a touch sensitive area located within the cover and spaced away from the keyboard at a distance, where the touch sensitive area may be unidentifiable in a non-border mode; a first side of the cover within the touch sensitive area includes a capacitance reference surface; a second side of the cover may be opposite the first side of the cover; a capacitance sensor disposed near the second side of the cover at the touch sensitive area; a processor; memory in communication with the processor; programmed instructions stored in the memory that, when executed, cause the processor to receive a non-contact input from the capacitance sensor; and send an instruction to switch the touch sensitive area from a non-border mode to a border mode in response to the non-contact input where the non-contact input represents a proximity measurement that may be over one millimeter away from the cover.

In some embodiments, a computer-program product may identify a touch sensitive area of a user input surface. The computer-program product may have a non-transitory computer-readable medium storing instructions executable by a processor to receive a user input from a sensor located adjacent a backside of a touch sensitive area of a cover and send an instruction to illuminate a feature of the touch sensitive area in response to the user input; where the user input may be a non-contact input in that may be spaced away from the user input surface within a range of one millimeter to 12 inches away from the touch sensitive area.

The feature may be a virtual key integrated into the touch sensitive area.

The feature may be at least a portion of a border indicating the touch sensitive area.

The border may include a continuous illuminated line.

The border may include multiple illuminated segments collectively forming the border.

The border may include illuminated markers located near a corner of the touch sensitive area.

The user input may be a radar input.

The user input may be an ultrasonic input.

The user input may be a capacitance input.

BRIEF DESCRIPTION OF THE DRAWINGS

FIG. 13 depicts an example of a border in communication with a controller in accordance with the disclosure.

FIG. 14 depicts an example of a border in accordance with the disclosure.

Figure 1:
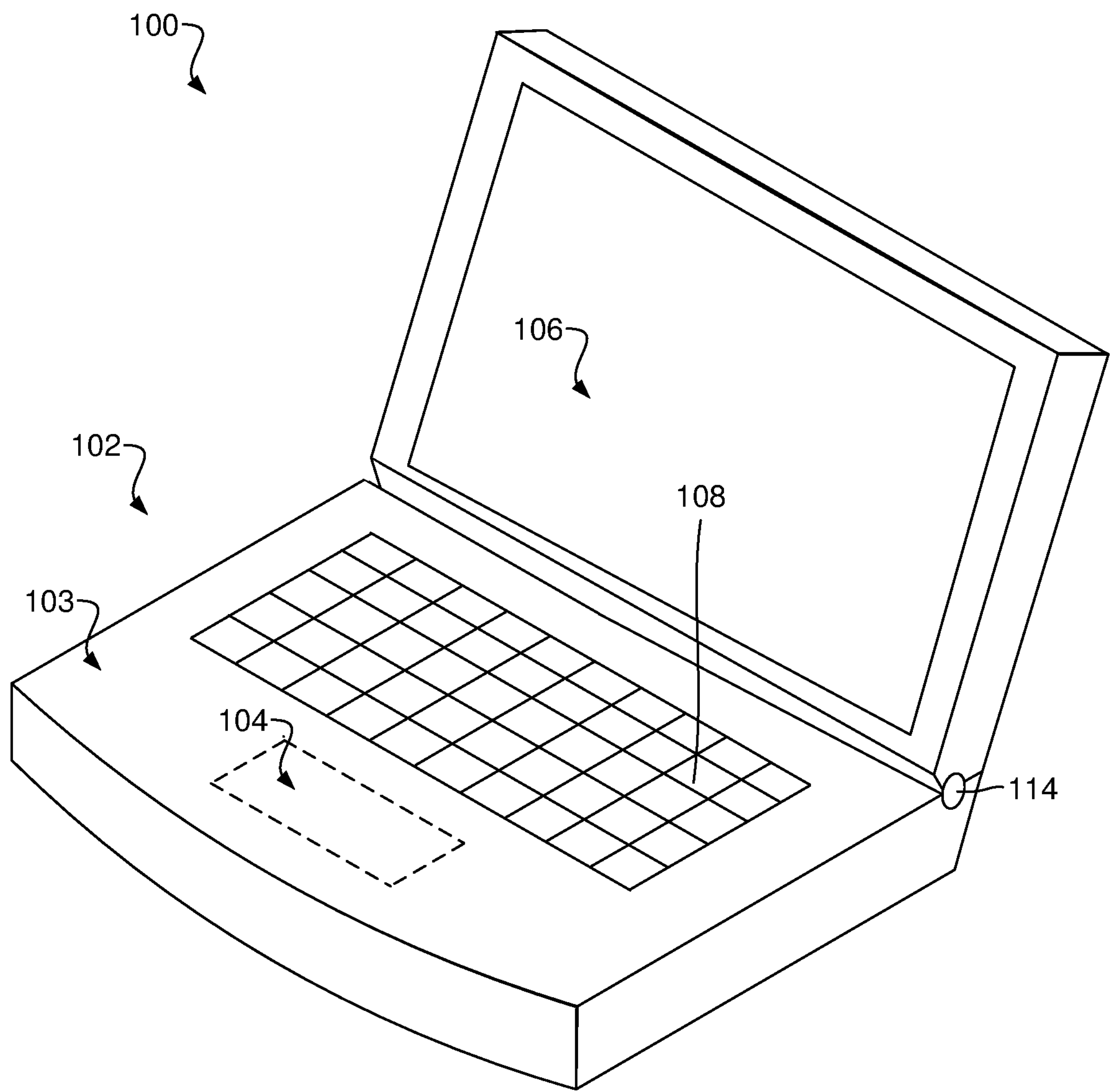
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term “aligned” generally refers to being parallel, substantially parallel, or forming an angle of less than 35.0 degrees. For purposes of this disclosure, the term “transverse” generally refers to perpendicular, substantially perpendicular, or forming an angle between 55.0 and 125.0 degrees. For purposes of this disclosure, the term “length” generally refers to the longest dimension of an object. For purposes of this disclosure, the term “width” generally refers to the dimension of an object from side to side and may refer to measuring across an object perpendicular to the object’s length.

For purposes of this disclosure, the term “electrode” may generally refer to a portion of an electrical conductor intended to be used to make a measurement, and the terms “route” and “trace” generally refer to portions of an electrical conductor that are not intended to make a measurement. For purposes of this disclosure in reference to circuits, the term “line” generally refers to the combination of an electrode and a “route” or “trace” portions of the electrical conductor. For purposes of this disclosure, the term “Tx” generally refers to a transmit line, electrode, or portions thereof, and the term “Rx” generally refers to a sense line, electrode, or portions thereof.

For the purposes of this disclosure, the term “electronic device” may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "keyboard input" may generally refer to an input on a keyboard that sends a specific electrical signal to a controller in communication with the keyboard. In some examples, a keyboard input may send a signal to a controller to indicate that a certain key on the keyboard has been pressed. In some examples, a controller in communication with the keyboard may determine the key, the location of the key, the length of the press on the key, the pressure exerted on the key, another property of the input, or a combination thereof. In some examples, the keyboard input may correspond to an electrical short created by a key being pressed and making contact with an array of contacts on the keyboard. In other examples, a keyboard input may correspond to a capacitive reading on the grid of contacts based on an object moving proximate the keyboard. In some examples, the keyboard is a separate input device from the capacitance module. In some cases, a controller controlling an operation of the keyboard is independent of another controller that controls the operation of the capacitance module. In some cases, the location of the keyboard input may determine the mode for the touch inputs. In some examples, the location of the keyboard input may determine which portion of the capacitance module operates in a different mode. For example, keyboard inputs for buttons located forward of (e.g., towards the display of the laptop) and near the right side of the capacitance module may cause the capacitance module to switch a different mode on just the right portion of the capacitance module.

For the purposes of this disclosure, the term "capacitive input keyboard" may generally refer to a keyboard that receives inputs based on capacitive signals from an object moving proximate the keyboard. In some examples, a capacitive input keyboard may be integrated into a touch screen device. In some examples, a capacitive keyboard may change size, shape, or location based on inputs from a controller in communication with the keyboard. In some examples, a capacitive input keyboard may determine the location, magnitude, velocity, another property, or a combination thereof, of a capacitive input of an object moving proximate the capacitive input keyboard.

For the purposes of this disclosure, the term "cover" may generally refer to a material with a thickness that, in part, defines a cavity. Electronics, such as a capacitance sensor, a battery, memory, a central processing unit, an audio speaker, another types of circuitry, or combination thereof may be disposed within the cavity. In some examples, a display, a keyboard, a speaker grill, another type of user interface, or combination thereof, may be incorporated into the cover. In some cases, an electronic device includes a hinge that connects a display portion to a keyboard portion. In such an example, the cover may refer to an inside surface of the hinged device when the display portion is rotated to come into contact with the keyboard portion, and the keyboard is incorporated into the cover. In some cases, the cover includes a seamless palm rest portion that is adjacent to and spaced away from the keyboard. A seamless palm rest portion may be made of a solid, continuous material, such as glass, metal, plastic, another material, hybrids thereof, mixtures there, or combinations thereof. In some cases, the seamless palm rest portion also includes a touch sensitive area that is indistinguishable from other areas of the palm rest portion when there is no illuminated feature to identify where the touch sensitive area is located. The texture of the touch sensitive area and the other areas of the palm rest portion may be the same. The look of the touch sensitive area and the other areas of the palm rest portion may be the same. However, in some examples of a non-seamless palm rest portion, an opening may be defined in the palm rest portion of the cover for the insertion of an overlay to a capacitance module.

The touch sensitive area may be formed in conjunction with a capacitance module formed either adjacent to the cover or to an overlay inserted into the cover. In a seamless palm rest portion, the first surface of the cover may be accessible for touch by a user and a second side of the cover may be obscured from the user's view and inside a cavity defined, in part, by the cover. Near the second side of the cover and within the cavity, a capacitance module may be positioned to detect changes in capacitance within a predetermined area of the first surface of the cover, which may define the touch sensitive area. In some examples where an overlay is inserted into an opening of the cover, the capacitance module may be located within the cavity near the overlay and may form a touch sensitive area on the accessible surface of the overlay.

For the purposes of this disclosure, the term "selectively illuminable light source" may generally refer to a light source, where the amount of energy that the light source radiates can be adjusted. For example, the light source may be turned off or on based on a command from a controller. In some examples, the amount of power outputted to the light source may be adjusted based on a command from the controller. In some examples, making changes to the power output to the light source may be event triggered. A non-exhaustive list of event-based triggers may include turning on the electronic device, adjusting a power setting of the electronic device, or receiving a contact input, a non-contact input, other type of user input, or combination thereof. In some examples, the light source includes a light emitting diode, a bulb, a light transmission element, a lamp, a cathode lamp, a light guide, another type of light source, or combination thereof. In some cases, the light source is incorporated into the capacitance module. In other cases, the light source is located between the cover and/or overlay and the capacitance module. In some instances, the light source is independent of the capacitance module. In some cases, the light source's energy output is adjusted by a controller incorporated into the capacitance module. In other examples, the light source's energy output is adjusted by a controller that is independent of the capacitance module.

In some cases, the light source is placed adjacent to the second side of the cover, within the cavity defined in part by the cover, such that when the light source is illuminated, at least a portion of the radiated light is visible through the cover. In some cases, a light guide may direct the light to form shapes, borders, symbols, keys, other features, or combinations thereof in the sensitive touch area or close to the sensitive touch area when the light source is on.

For the purposes of this disclosure, the term "non-contact input" may generally refer to a user input that does not make contact with the touch sensitive area, the cover, the keyboard, the display, or combinations thereof. In such cases, the non-contact input is made in a three-dimensional space within a predetermined distance range of the touch sensitive area. In some cases, the predefined range starts over one millimeter from the touch sensitive area of the cover, over two millimeters from the touch sensitive area, over three millimeters from the touch sensitive area, over five millimeters from the touch sensitive area, over a centimeter from the touch sensitive area, over two centimeters from the touch sensitive area, over five centimeters from the touch sensitive area, over an inch from the touch sensitive area, over two inches from the touch sensitive area, over five inches from the touch sensitive, another appropriate distance range from the touch sensitive area, or combination thereof. In some cases, the distance range ends within twelve inches of the touch sensitive area, within eight inches of the touch sensitive area, within five inches of the touch sensitive area, within three inches of the touch sensitive, within one inch of the touch sensitive area, or combinations thereof.

In some examples, the distance range is transverse to a plane formed by the cover. In some cases, the distance range is an angular distance that is formed with an angular range between 5 degrees and 85 degrees off of the cover, 10 degrees to 80 degrees off of the cover, 15 degrees to 75 degrees off of the cover, 20 degrees to 60 degrees off of the cover, another appropriate angular range, or combinations thereof.

In some cases, the non-contact input may be detected with a capacitance sensor incorporated into the capacitance module. In other examples, the non-contact input may be detected with a radar sensor, an ultrasonic sensor, another type of sensor, or combinations thereof. The non-contact input may include the movement or the presence of a user hand, finger, stylus, a user body part, or combinations thereof within the predetermined distance range from the touch sensitive area.

For the purposes of this disclosure, the term "contact input" may generally refer to a user input that includes making contact with the cover, the display, the keyboard, the touch sensitive area, or combinations thereof. In some examples, a contact input involves touching the touch sensitive area, the display, the cover, the keyboard, or remote device, another type of device, or combinations thereof. In some cases, the contact input includes applying a force to the touched surface. In some examples, a haptic sensation may be imparted back to the user in response to a contact input.

For the purposes of this disclosure, the term "virtual key" may generally refer to a predetermined area of a touch sensitive area that is programmed to respond to key presses. For example, a sub-area that is illuminated within a touch sensitive area may represent an alphanumeric symbol to correspond to a typing pad. In some cases, a capacitance sensor may detect a contact input within the sub-area designated as a virtual key.

For the purposes of this disclosure, the term "non-border mode" may generally refer to a mode where there is no border depicted between the touch sensitive area and at least one other area of the palm rest portion of the cover. In some examples where the cover is seamless within the palm rest portion, the touch sensitive area may be indistinguishable from the other portions of the cover during the non-border mode.

For the purposes of this disclosure, the term "border mode" may generally refer to a mode where at least one feature is illuminated in or near the touch sensitive area so that the touch sensitive area is identifiable. For example, in the border mode, a border or features indicating a boundary of the touch sensitive area, may be illuminated about the touch sensitive area.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approaches the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
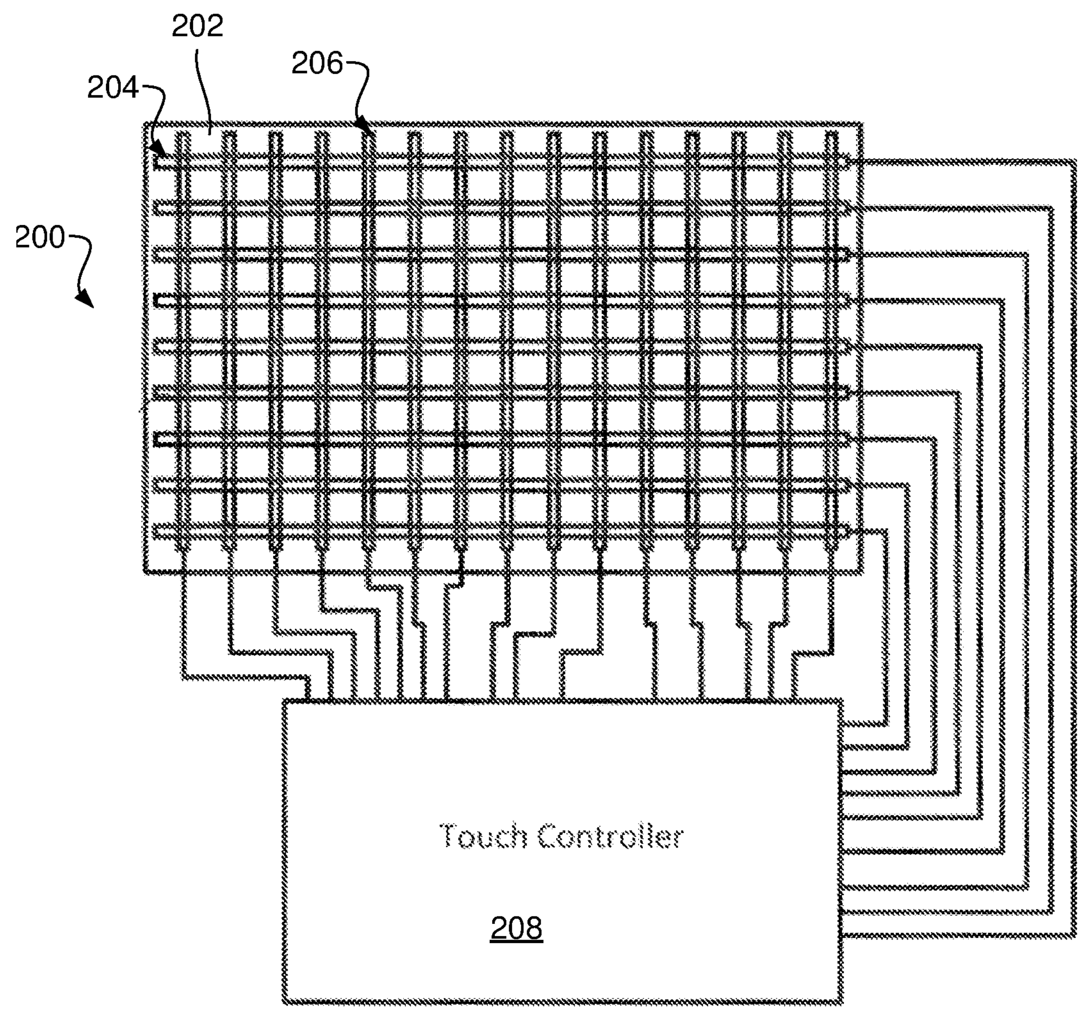
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in the alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
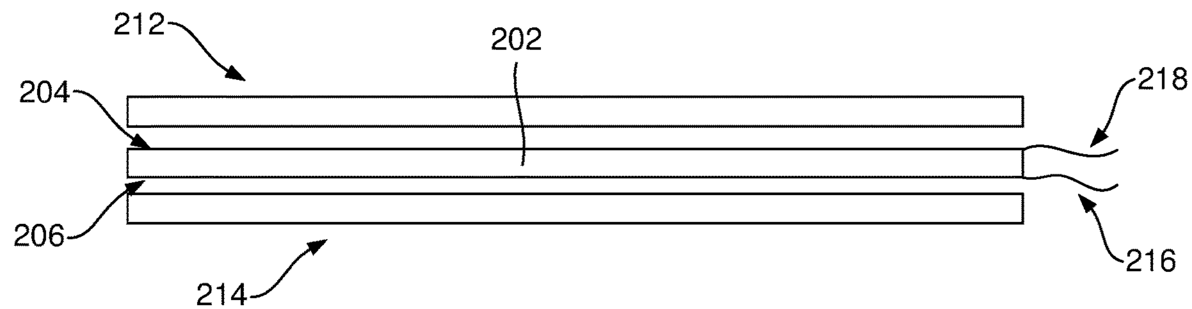
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approaches the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
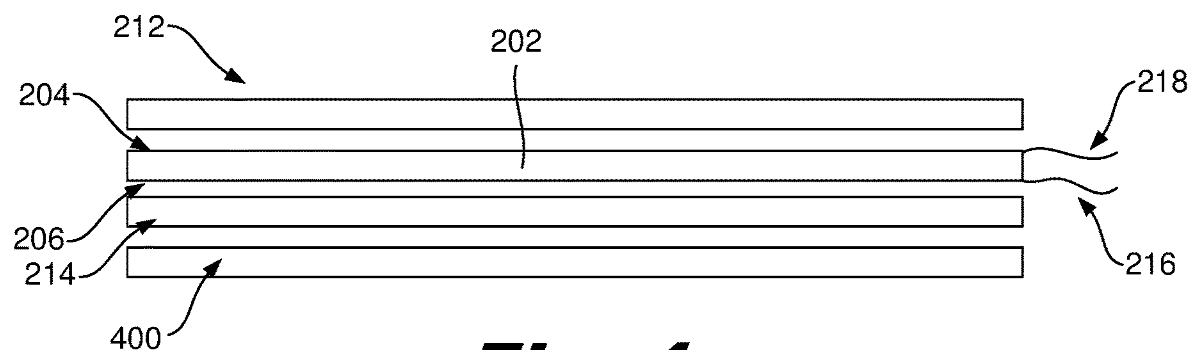
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

In some examples, the capacitance module may include a pressure sensor, in other examples, the pressure sensors are not incorporated with a capacitance module. Further, any appropriate type of pressure sensor may be used in accordance with the principles described herein. For example, a non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, other types of pressure sensors, or combinations thereof.

In some examples, the pressure sensor may also include an ability to provide haptic feedback. For example, a piezoelectric device may be used as both a pressure sensor and as a haptic device. When the piezoelectric material is compressed due to the application of pressure through the capacitance reference surface, the piezoelectric material may produce an electric signal with can be detected by a controller. In some cases, the controller may produce an electric signal that is sent to the piezoelectric material to cause the piezoelectric material to expand, contract, and/or vibrate. The vibrations from the piezoelectric material may cause the capacitance reference surface to vibrate. This vibration may communicate a haptic signal to the user. However, in some examples, the pressure sensors are not configured to provide a haptic signal.

Figure 5:
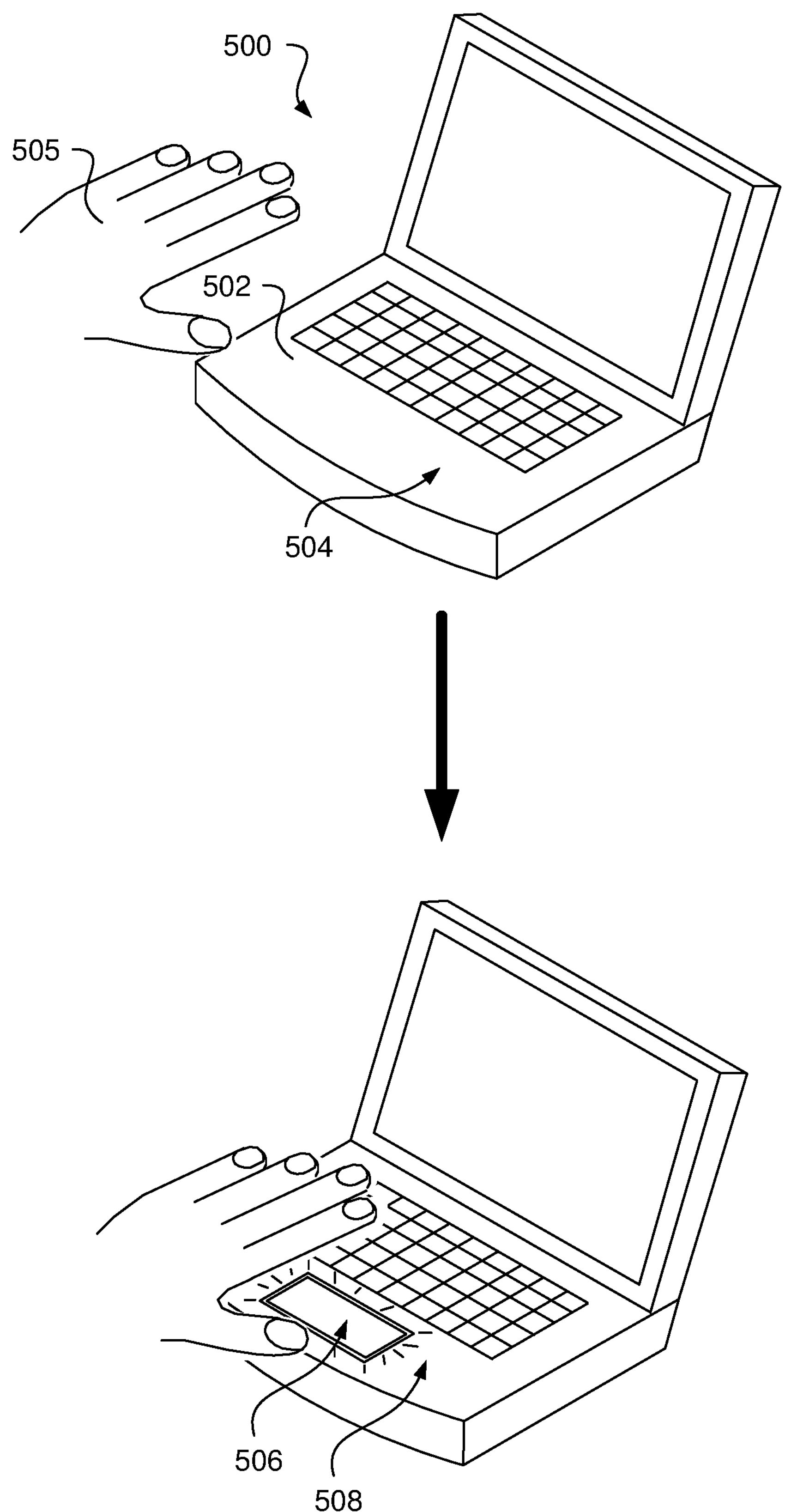
FIG. 5 depicts an example of a touch sensitive area in accordance with the disclosure.

FIG. 5 depicts an example of an electronic device 500 with a cover 502 that has a palm rest portion 504 that has a seamless appearance. In this example, when a user's hand 505 is away from the cover out of a predetermined range, the location of a touch sensitive area 506 is indistinguishable from the non-touch sensitive areas 508 of the palm rest portion 504 of the cover 502. When the user's hand 505 moves into or is within the predetermined range, the hand may be detected with a sensor. In some cases, the sensor may be a radar sensor, an ultrasonic sensor, a capacitance sensor, a proximity sensor, another type of sensor, or combination thereof. In some cases, a capacitance module may be located within a cavity of the electronic device 500 that is at least partially defined with the cover 502. Such a sensor may not be visible within the depiction of FIG. 5 since the sensor's presence is hidden by the cover. Such a capacitance sensor may detect the contact of the user's hand on the touch sensitive area 506 and may also be used to detect the user's non-contact inputs that are spaced away from and separated from the cover 502 at a distance, but still within the predetermined distance range.

In some examples, in response to detecting the hand 505 within the predetermined distance range, but not making contact with the cover 502 within or without the touch sensitive area 508, an instruction may be sent to illuminate a feature associated with the touch sensitive area 508. In other examples, the instruction may be sent to illuminate the feature associated with the touch sensitive area 508 in response to a non-contact input within the predetermined distance range or in response to a contact input where the user physically touches and/or applies a pressure to the cover within or outside of the touch sensitive area 508. The illuminated feature may be at least a portion of a border around or within the touch sensitive area. In some examples, the illuminated feature is an entire border of or within the touch sensitive area. In some cases, the illuminated feature may be a segmented border, a single side of a border, multiple sides of a border, a corner of a border, multiple corners of a border, a marker of a border, or combinations thereof. In some examples, the feature may include a virtual key, a symbol, a marking, or another feature that is not part of a border of the touch sensitive area, but is located within the touch sensitive area 508. In some examples, a touch sensitive area 508 is distinguishable from the non-touch sensitive areas when the feature is illuminated.

The feature may be illuminated from a light source that is located on a second side of the cover 502. For example, the first side of the cover 502 may be visible to the user and may be an outer surface of the cover 502. The second side of the cover 502 may be an inner surface of a cavity defined, in part, by the cover. The light source may be configured to illuminate when triggered by the non-contact input. The light source may be arranged such that the light radiating out of the light source is visible through the cover in a region near the feature. In some examples, the feature may include a material that appears to be the same material as the rest of the cover, but includes a property of transmitting light from the light source through the thickness of the cover while the material of other portions of the cover have a property of blocking the transmission of light through the cover.

The principles described herein include advantages not disclosed in the prior art. For example, none of the references in the background of this document include features that help a user identify the location of a hidden touch sensitive area in a seamless palm rest portion of a cover before the user makes physical contact with the cover. Thus, triggering illumination associated with a touch sensitive area from a non-contact input may guide the user to make contact input within the location that the user desires to make contact.

For example, some references, including some of those mentioned in the background, include descriptions where a user makes physical contact with a touch pad before a border is illuminated. Each of the cited references describes touching or making physical contact before a border is illuminated. This requires the user to guess the location of the touch sensitive area since the touch sensitive area is hidden when the user is intending to make contact. In some cases, the user may not know where the boundaries of the touch sensitive area is when making contact. This may lead to user error.

Making physical contact with the touch pad prior to knowing where the touch pad is located may increase user error. For example, a user may think that he or she is approaching the area where a touch sensitive area is located and discover that he or she is not making contact with the touch sensitive area. In such an example, the user may desire to move his or her hand over to reposition the hand within the touch sensitive area. This may cause the user to inadvertently make a swiping input into the touch sensitive area, which may result in triggering an action that the user did not intend. Even if the user makes initial contact within the touch sensitive area, the user may have intended to make a user input within the central portion or a side portion of the touch sensitive area, but instead made contact in a different, unintended area. This may cause the user to inherently react by repositioning his or her hand to the desired location risking an inadvertent swiping user input.

In examples where the user input is a virtual key, the user may desire that the key's location is revealed before he or she makes contact with the cover. Otherwise, the user may become frustrated by striking a portion of the cover where no virtual key is located.

In some examples, the illuminated feature causes a touch sensitive area to be distinguishable from an adjacent non-touch sensitive area that is of the same continuous flat surface where both areas have the same texture, same elevation, and/or same color. In some cases, the illuminated feature causes a touch sensitive area to be distinguishable from an adjacent non-touch sensitive area regardless of the lighting environment in which the electronic device is located.

Figure 6A:
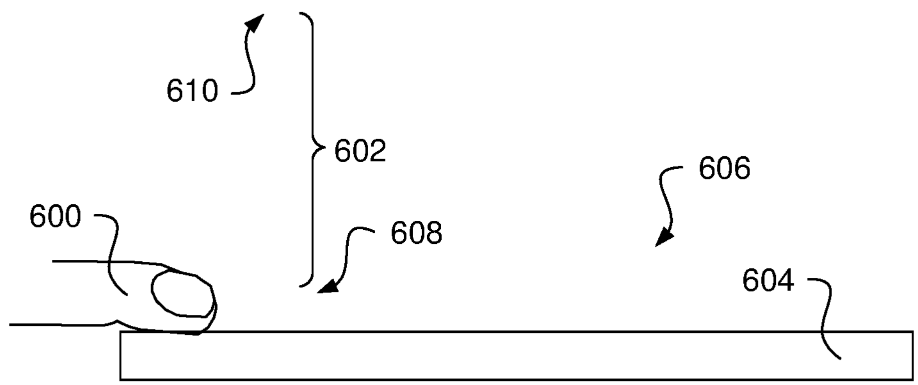
FIG. 6A depicts an example of being outside a predetermined distance range in accordance with the disclosure.
Figure 6B:
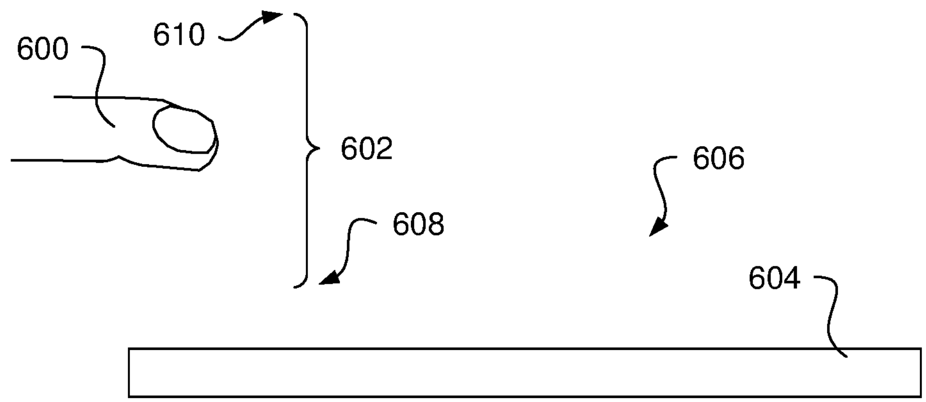
FIG. 6B depicts an example of a non-contact input in accordance with the disclosure.
Figure 6C:
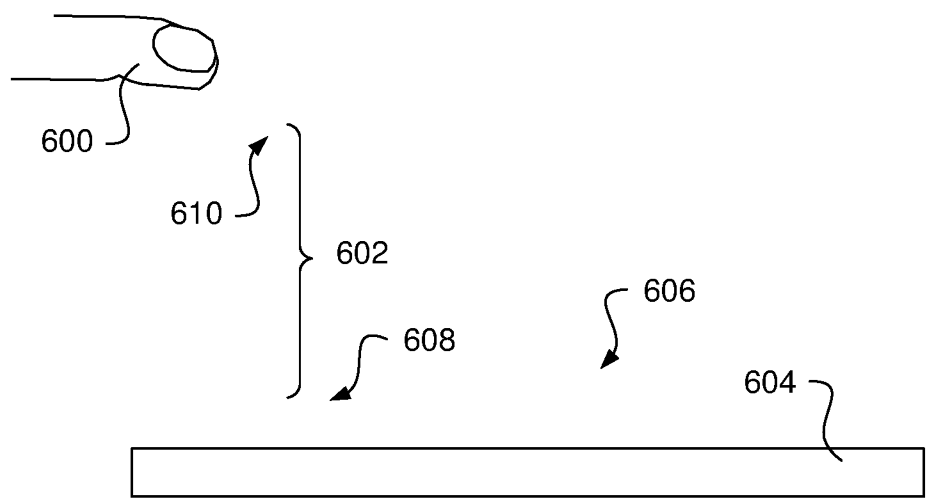
FIG. 6C depicts an example of a contact input in accordance with the disclosure.

FIG. 6A-C depict examples of a user's finger 600 in relation to a predetermined distance range 602 from the cover 604 of an electronic device 606.

Figure 6D:
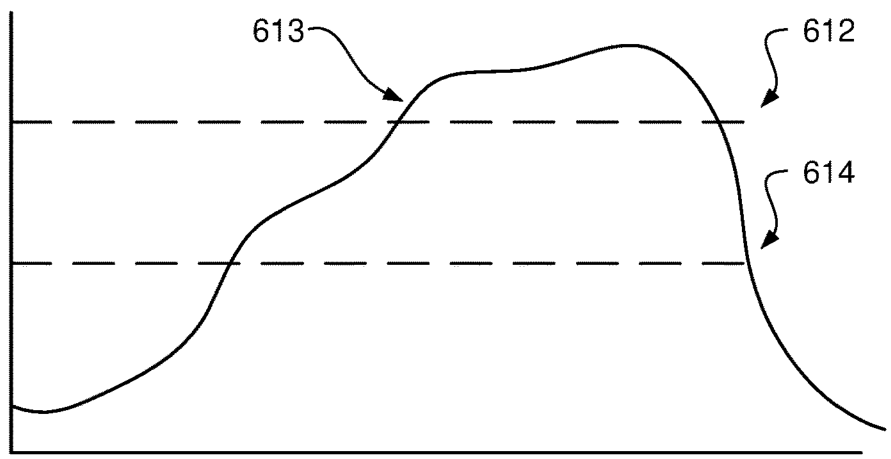
FIG. 6D depicts an example of a sensor measurement in accordance with the disclosure.

FIG. 6A depicts the finger 600 outside of the predetermined distance 602 and making contact with the cover 604. In this example, the finger 600 is between the cover 604 and the start 608 of the predetermined distance range 602. FIG. 6D represents an example of a capacitance measurement corresponding to FIG. 6A.

Figure 6E:
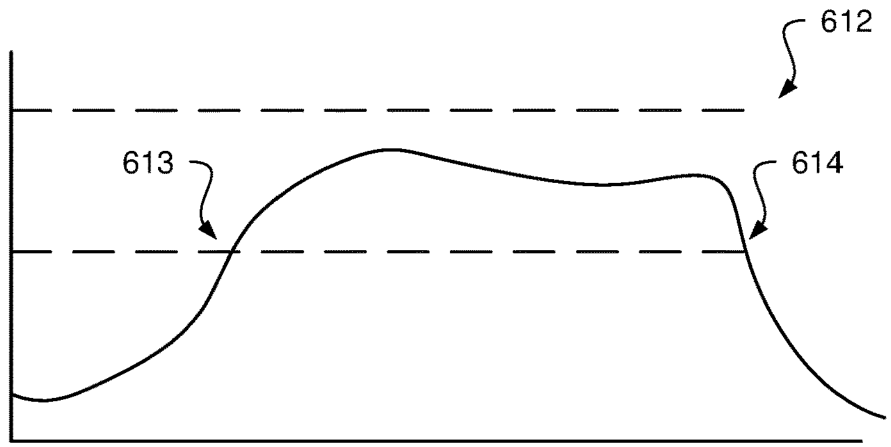
FIG. 6E depicts an example of a sensor measurement in accordance with the disclosure.

FIG. 6B depicts an example where the finger 600 is within the predetermined distance range 602. FIG. 6E represents an example of a capacitance measurement corresponding to FIG. 6B.

Figure 6F:
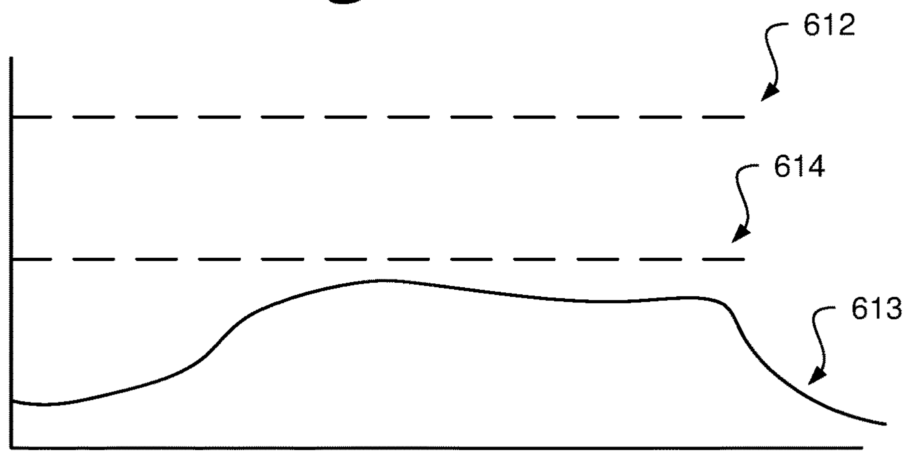
FIG. 6F depicts an example of a sensor measurement in accordance with the disclosure.

FIG. 6C depicts an example where the finger 600 is outside of the predetermined distance range 602. In this example, the predetermined distance range 602 is between the finger 600 and the cover 604. FIG. 6F represents an example of a capacitance measurement corresponding to FIG. 6C.

The predetermined distance 602 may be a range that does not come into contact with the cover 602. For example, the range for the predetermined distance may start 608 at least one millimeter away from the cover, at least two millimeters away from the cover, at least three millimeters away from the cover, at least five millimeters away from the cover, at least 10 millimeters away from the cover, at least one centimeter away from the cover, at least two centimeters away from the cover, at least three centimeters away from the cover, at least five centimeters away from the cover, at least one inch away from the cover, another appropriate distance, or combinations thereof. A far end 610 of the predetermined range may be within twelve inches from the cover, within ten inches of the cover, within five inches of the cover, within three inches of the cover, another appropriate distance, or combinations thereof.

FIG. 6D depicts an example of a capacitance measurement 613 from a sensor located within the cavity defined, in part, by the cover. In this example, the first threshold 612 represents a capacitance measurement where the finger is determined to be in contact with the cover. In the illustrated example, the capacitance measurement is above the first threshold 612. Thus, a controller in communication with the capacitance sensor may interpret the measurement as a contact input. In this example, the capacitance measurement has to be above both the first threshold 612 and the second threshold 614 to be determined to be a contact input.

FIG. 6E depicts an example of a capacitance measurement from the capacitance sensor. In this example, the second threshold 614 represents a capacitance measurement where the finger is determined to be either making a contact input or a non-contact input. The second threshold 614 represents a weaker capacitance measurement than the first threshold 612. If the capacitance measurement is between the first threshold 512 and the second threshold 614, the controller may determine that the finger 600 is within the predetermined distance range and represents a non-contact input. In this example, the capacitance measurement is determined to represent a non-contact input. As a result, the controller may send an instruction to illuminate a feature within the touch sensitive area.

FIG. 6F depicts an example of a capacitance measurement from the capacitance sensor. In this example, the capacitance measurement is below the second threshold 614. In this example the controller may determine that the finger is outside of the predetermined distance range and is also too far away from the cover to be intended as a user input. Thus, in this example, the controller may determine that the capacitance measurement is noise and/or not intended to be a user input.

In some examples, the first threshold corresponds to a first capacitance value that represents contact input. The feature may be illuminated when the capacitance sensors measures a value below the first capacitance value that represents the contact input.

The capacitance measurement that represents the start of the predetermined distance range may be a second capacitance value that is below the first capacitance value. The capacitance value that corresponds to the end of the predetermined distance range may be a third capacitance value that is below the second capacitance value. The feature may be illuminated when the capacitance measurement is between the first and the second capacitance values. In some cases, the third capacitance value is above a noise capacitance value.

Figure 7:
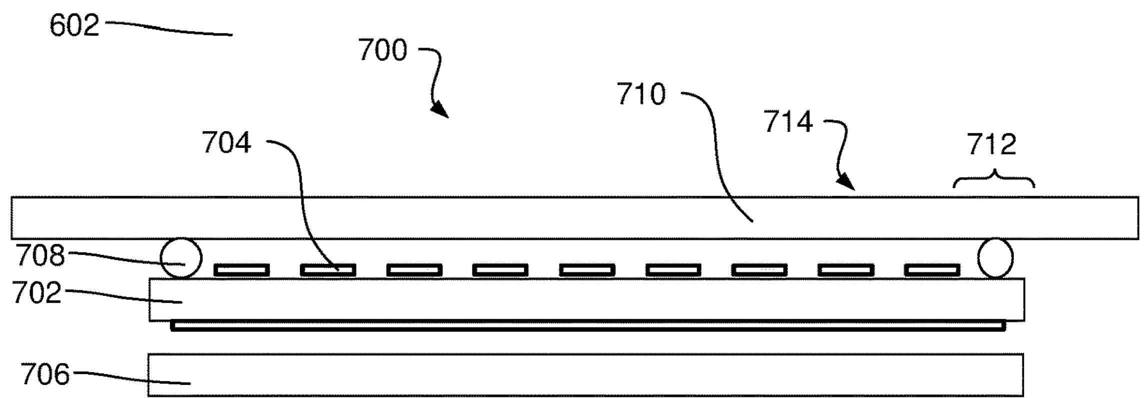
FIG. 7 depicts an example of a capacitance module in accordance with the disclosure.

FIG. 7 is an example of a capacitance module 700. In this example, the capacitance module 700 includes a first layer 702, which may include the electrodes 704 that form the capacitance sensor. The capacitance sensor 700 may also include a second layer 706 that may include a shield and/or components for controlling the capacitance sensor, such as a controller.

A light source 708 may be disposed on the first layer 702 with the electrodes 704. In this example, the light source 708 is adjacent to the cover 710. An optical region 712 of the cover 710 adjacent to the light source 708 may include a property that allows at least a portion of the light emitted by the light source 708 to be transmitted through the thickness of the cover 710. Non-optical regions 714 of the cover 710 may be located next to the optical region 712 and have a characteristic of blocking light from the light source 708 from being transmitted through the thickness of the cover 710.

In some examples, the light source is a light emitting diode. However, any appropriate type of light source may be used in accordance with the principles described herein.

Figure 8:
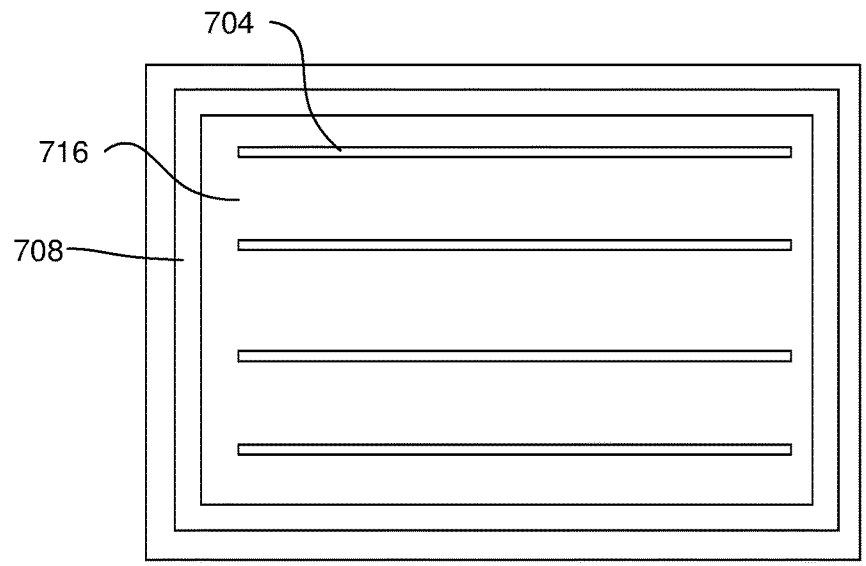
FIG. 8 depicts an example of a capacitance module in accordance with the disclosure.

FIG. 8 depicts a top view of the example of FIG. 7. A portion of the capacitance electrodes 704 are formed on the first surface 716 of the first layer. In this example, the light source 708 is also formed on the first surface 716 and surrounds the electrodes 704.

Figure 9:
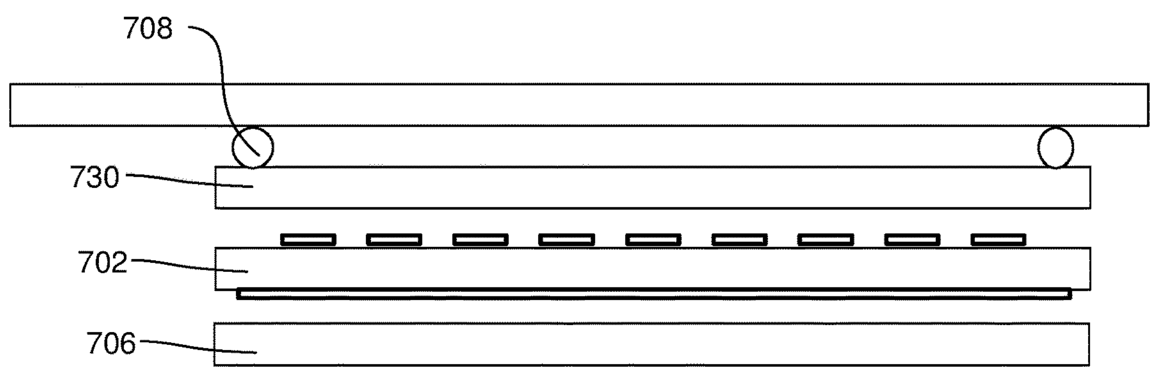
FIG. 9 depicts an example of a capacitance module in accordance with the disclosure.

FIG. 9 depicts another example of a capacitance module 710. In this example, the light source is deposed on a third layer 730 that is disposed between the cover 702 and the first layer 702 with the capacitance electrodes.

Figure 10:
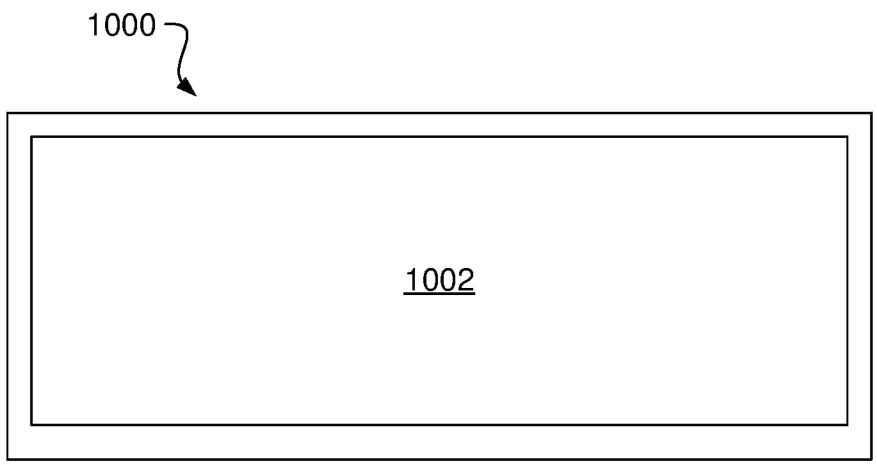
FIG. 10 depicts an example of a border in accordance with the disclosure.
Figure 11:
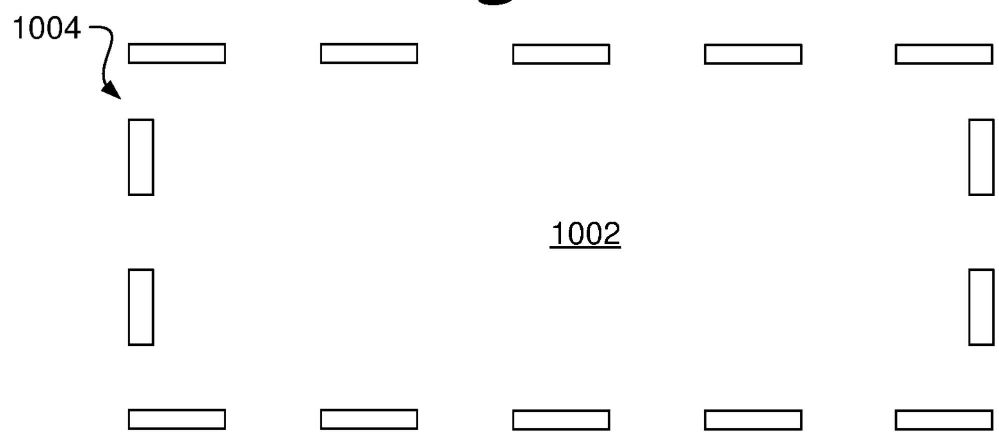
FIG. 11 depicts an example of a border in accordance with the disclosure.
Figure 12:
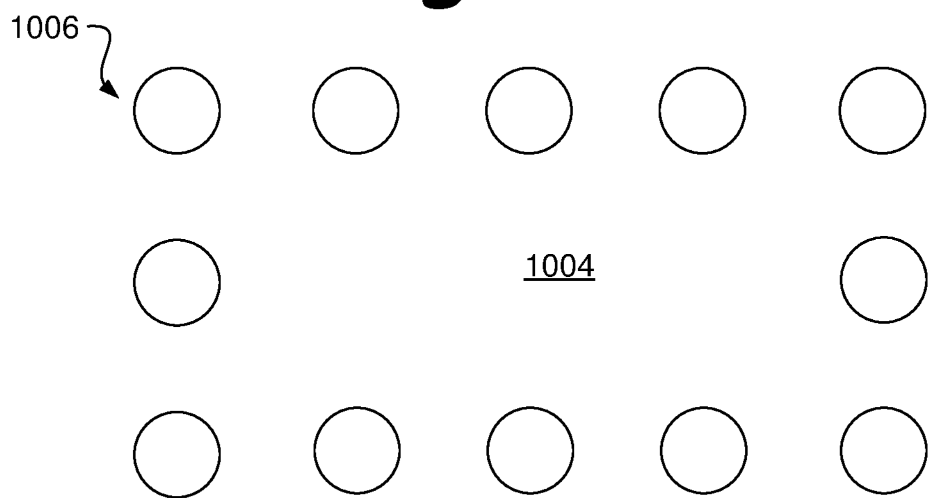
FIG. 12 depicts an example of a border in accordance with the disclosure.
Figures 13, 14:
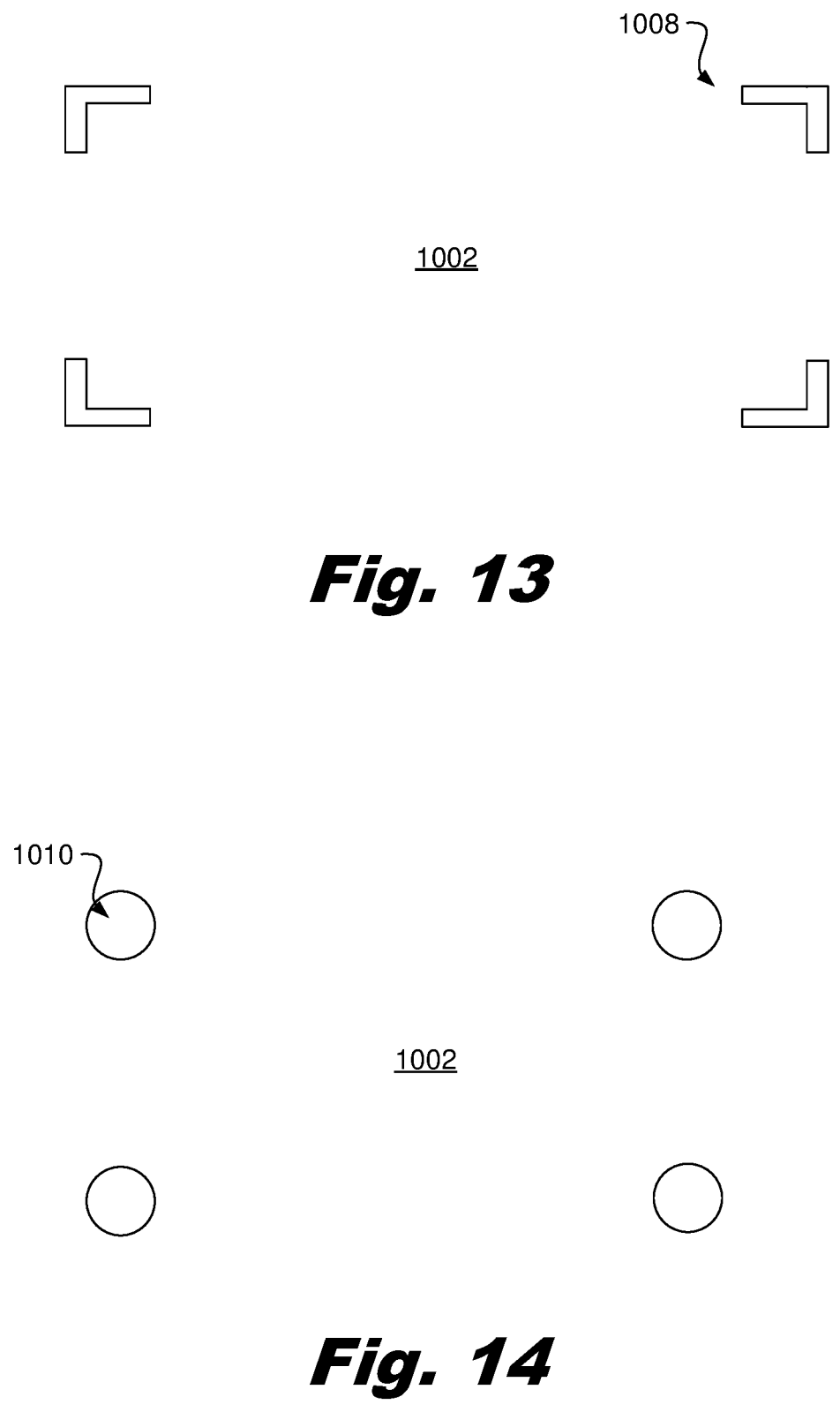

FIGS. 10-14 depict examples of illuminated features. FIG. 10 depicts an example of a continuous single border 1000 that surrounds the touch sensitive area 1002. FIG. 11 depicts an example of a segmented border 1004 that surrounds the touch sensitive touch areas 1002. FIG. 12 depicts an example of a border 1006 that includes dots or other types of shapes. FIG. 13 depicts an example of corner markers 1008 that identify the touch sensitive area 1002. FIG. 14 depicts an example of circular shapes 1010 at the corners of the touch sensitive area 1002.

Figure 15:
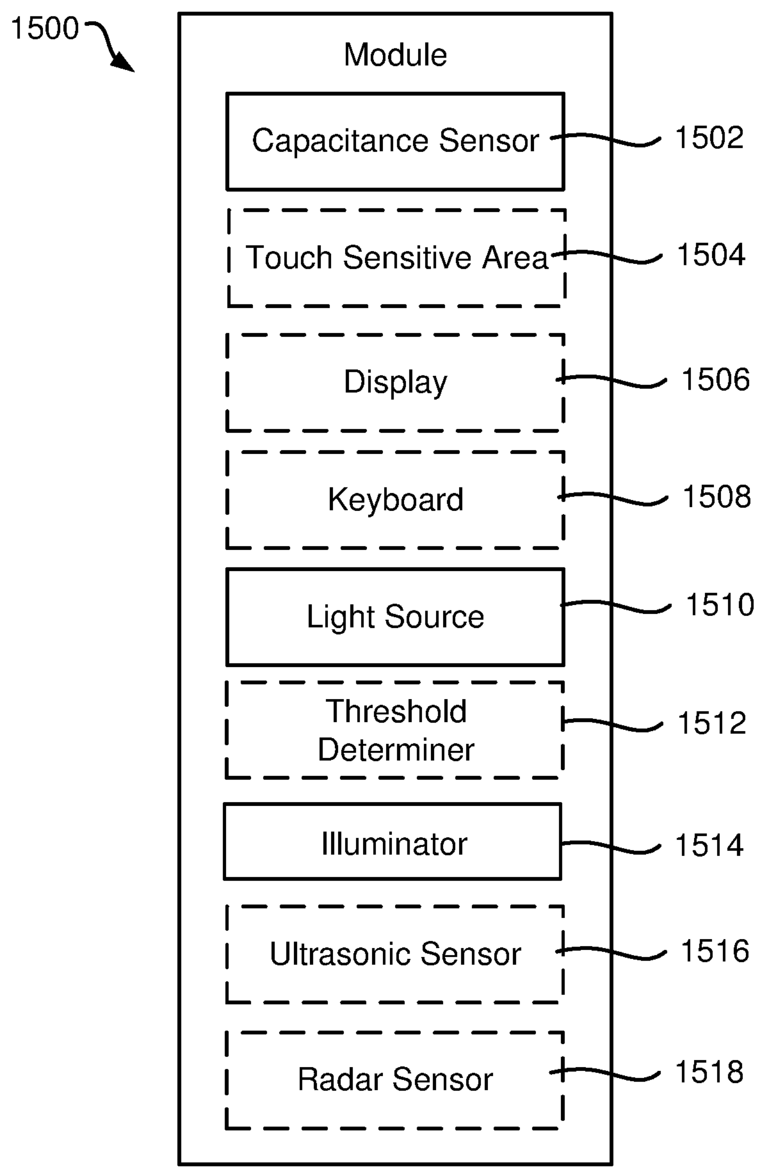
FIG. 15 depicts an example of a method of a module in accordance with the disclosure.

FIG. 15 depicts an example of a module 1500. In this example, the module 1500 includes programmed instructions in memory and may include associated firmware, logic, processing resources, memory resources, power sources, hardware, or other types of hardware to carry out the tasks of the module 1500. The module 1500 may be used in conjunction with the description of the devices, modules, and principles described in relation to FIGS. 1-14 and 16-18. In this example, the module 1500 includes a capacitance sensor 1502, a light source 1510, and an illuminator 1514. The module may optionally include a touch sensitive area 1504, a display 1506, a keyboard 1508, a threshold determiner 1512, an ultrasonic sensor 1516, and/or a radar sensor 1518.

The capacitance sensor 1502 may measure a capacitance that is near a surface of the cover. In some cases, the capacitance measurement may represent a user touching the cover. In some embodiments, the capacitance measurement may represent when a user is not touching the cover, but their hand and/or finger is positioned at a distance away from the cover, but still influences the capacitance adjacent to the cover.

In some examples, the module 1500 includes a touch sensitive area 1504 that includes an area that corresponds to at least a portion of the capacitance sensor. When a change in capacitance is detected within the touch sensitive area, the controller may determine there is a user input. The user input may be a contact input or a non-contact input.

In some examples, the module 1500 includes a display 1506. The display 1506 may be located at a different location than the touch sensitive area 1504. In some examples, the display 1506 is on the same surface as the touch sensitive area but is spaced apart and located at a distance away from the touch sensitive area. In some examples, the display is incorporated into a surface that is adjustably connected, hingedly connected, pivotally connected, movably connected, otherwise connected, or combinations thereof to the surface that incorporates the touch sensitive area.

In some examples, the module 1500 includes a keyboard 1508. In some cases, the keyboard 1508 is a mechanical switch-based keyboard. In some cases, the keyboard may be incorporated into the same surface as the touch sensitive area, but the keyboard may be spaced away from the touch sensitive area at a distance.

The light source 1510 may include incorporated into the module in any appropriate location. In some examples, the light source is located on the same surface and/or the same substrate as the electrodes of a capacitance sensor. In other examples, the light source is located on a different surface and/or substrate.

The module 1500 may include a threshold determiner 1512 that may be used to determine at least one capacitance measurement threshold. For example, the threshold determiner may determine a contact input threshold that corresponds to the capacitance value when a user is physically touching the touch sensitive area. In some examples, the threshold determiner may determine a non-contact input threshold that corresponds to the capacitance values when a user finger is within a predetermined distance range that is spaced away the touch sensitive area.

The illuminator 1514 may cause the light source to illuminate. In some cases, the illuminator is triggered when the finger is determined to be within the predetermined distance range. In some examples, the illuminator causes a border or another feature to illuminate near or within the touch sensitive area when operating in a border mode. In some examples, the illuminator does not cause a border or another feature to illuminate near or within the touch sensitive area when operating in a non-border mode.

In some modules 1500, the non-contact input is detected with an ultrasonic sensor 1516. In such an embodiment, a capacitance sensor 1502 may be used to detect contact inputs, and the ultrasonic sensor 1516 may be used to detect non-contact inputs. In some examples, the ultrasonic sensor 1516 is embedded in a stack of layers with the capacitance sensor 1502.

In some modules 1500, the non-contact input is detected with a radar sensor 1518. In such an embodiment, a capacitance sensor 1502 may be used to detect contact inputs, and the ultrasonic sensor 1518 may be used to detect non-contact inputs. In some examples, the ultrasonic sensor 1518 is embedded in a stack of layers with the capacitance sensor 1502.

Figure 16:
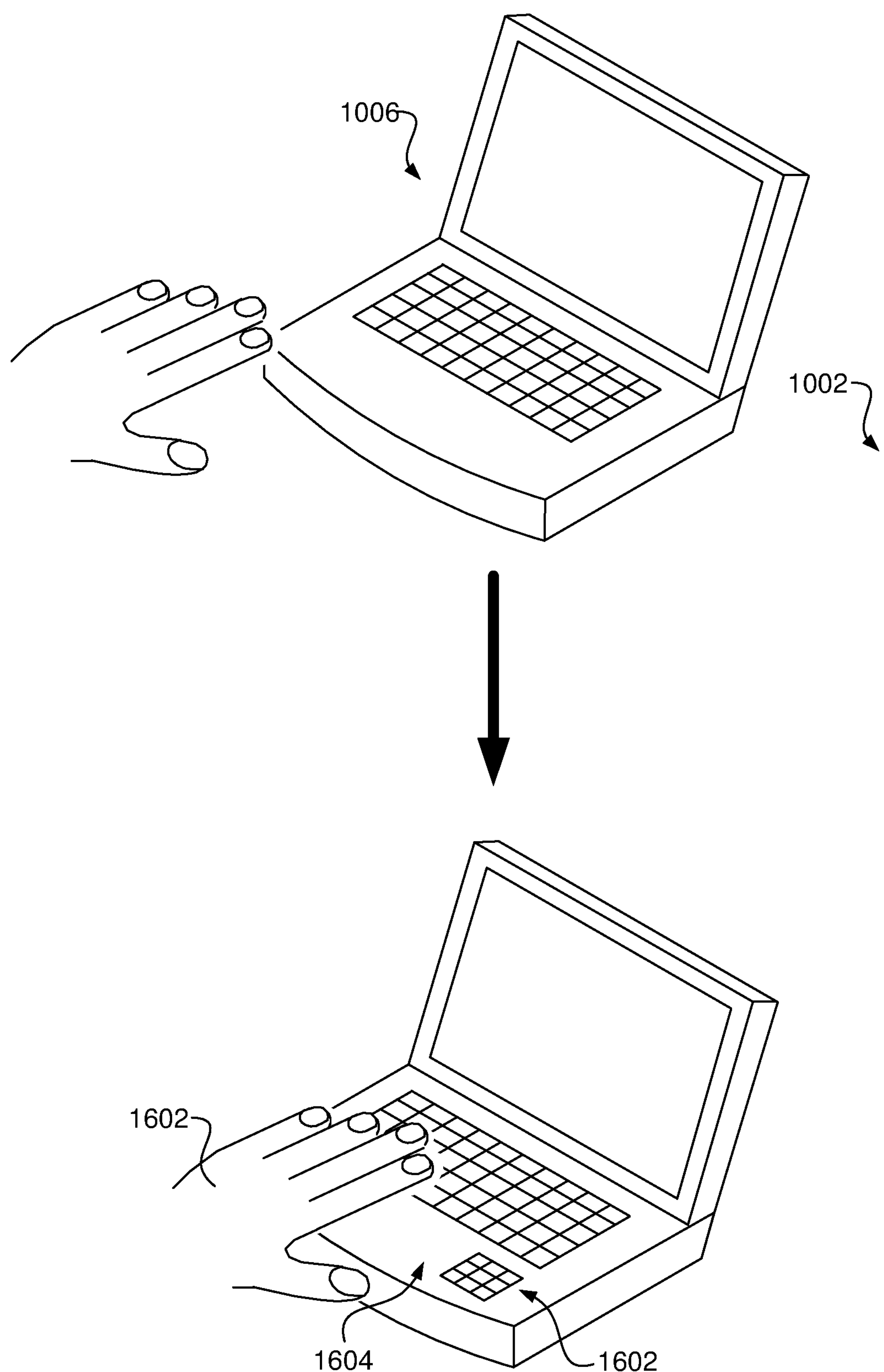
FIG. 16 depicts an example of a touch sensitive area of a module in accordance with the disclosure.

FIG. 16 includes an example of an illuminated feature that includes multiple virtual keys 1600. In this example, the virtual keys 1600 may be illuminated before the user brings his or her hand 1602 into contact with the cover 1604 when the hand 1602 is still within the predetermined distance range. In the illustrated example, the virtual keys are positioned to the side of the cover, but in other examples, the virtual keys may be positioned in any appropriate location within the palm rest area. Further, while this example depicts multiple virtual keys, in other examples, the illuminated feature may include just one virtual key. Further, while the virtual keys depicted in the illustrated example include three rows of three keys each, any appropriate number of keys and/or any appropriate arrangement of keys may be used in accordance with the principles described herein.

Figure 17:
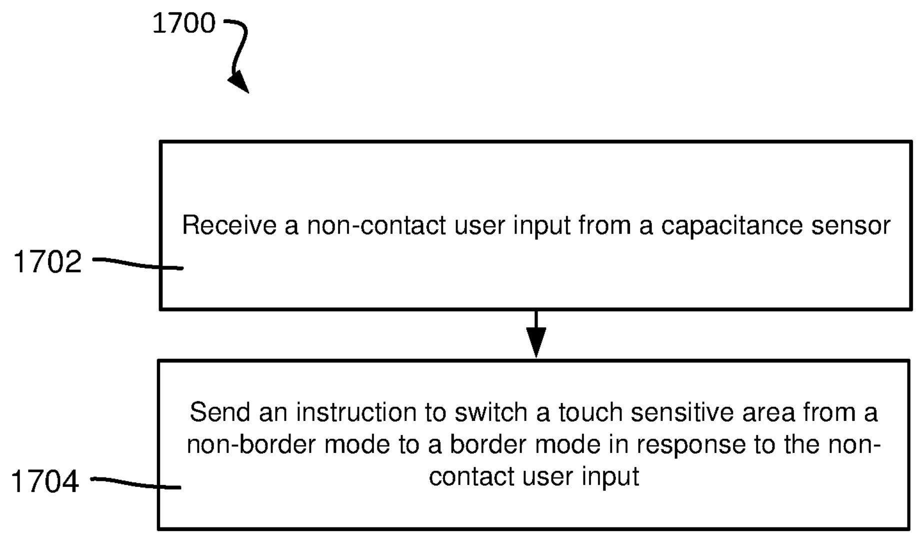
FIG. 17 depicts an example of a method of operating a capacitance module in accordance with the disclosure.

FIG. 17 depicts an example of a method 1700 of using a touch sensitive area. This method 1700 may be performed based on the description of the devices, modules, and principles described in relation to FIGS. 1-16. In this example, the method 1700 includes receiving 1702 a non-contact input from a capacitance sensor and sending 1704 an instruction to switch a touch sensitive area from a non-border mode to a border mode in response to the non-contact input.

Figure 18:
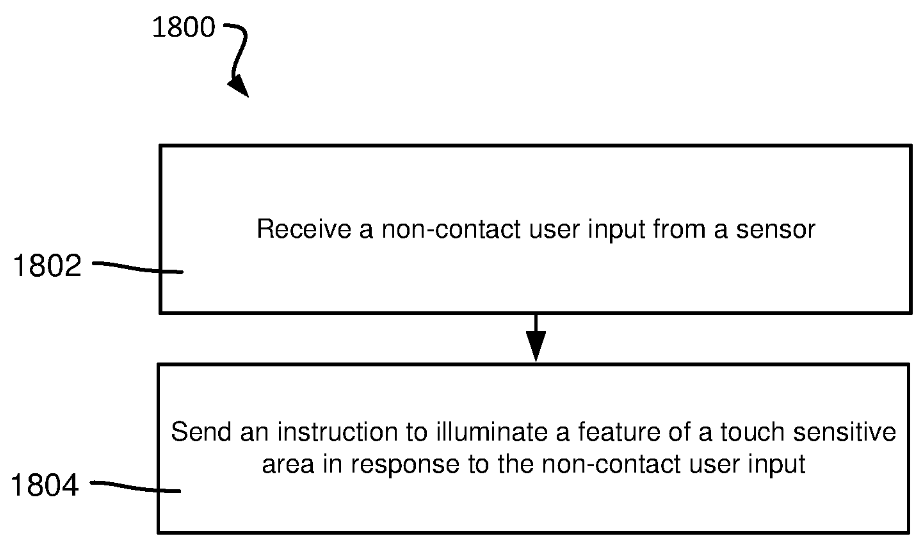
FIG. 18 depicts an example of a method of operating a capacitance module in accordance with the disclosure.

FIG. 18 depicts an example of a method 1800 of using a touch sensitive area. This method 1800 may be performed based on the description of the devices, modules, and principles described in relation to FIGS. 1-16. In this example, the method 1800 includes receiving 1802 a non-contact input from a sensor and sending 1804 an instruction to illuminate a feature of a touch sensitive area in response to the non-contact input.

In some cases, the feature is illuminated in response to detecting the finger or hand within the predetermined distance range and the feature may stay illuminated for a certain period of time. This period of time may be reset as additional user contacts and/or non-user contacts are detected.

In some examples, the border mode may be turned off in situations where it can be determined that the user is not using the touch sensitive area. For example, in situations where it is determined that the user is operating the keyboard, the touch sensitive area may be turned off or rendered inoperable to avoid falsely classifying a palm resting in the touch sensitive area as user input. A determination on whether the keyboard is being used may be based, at least in part, on input from the keyboard such as detecting the operation of a mechanical key, a virtual key, a change in capacitance over the keyboard, a measurement with an ultrasonic sensor, a measurement with a radar sensor, a measurement with another type of sensor, or combinations thereof.

In some examples, only a portion of the touch sensitive area may be operable under certain conditions. For example, if is determined that a user is operating a keyboard with his or her right hand, the system may disable or turn off a right portion of the touch sensitive area to avoid palm rest detection while continuing to operate the left portion of the touch sensitive area. In such an example, the border, markers, and/or other types of features indicating the touch sensitive area may be illuminated on just the left side of the touch sensitive area.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An electronic device, including:

a display;

a cover connected to the display, the cover having a flat continuous surface;

a touch sensitive area located within the cover and on the flat continuous surface and spaced away from the display at a distance, the touch sensitive area aligning with a capacitance sensor;

a non-touch sensitive area that is on the flat continuous surface of the cover;

the touch sensitive area and the non-touch sensitive area are indistinguishable from each other;

a first side of the cover within the touch sensitive area includes a capacitance reference surface;

a second side of the cover is opposite the first side of the cover;

the capacitance sensor disposed near the second side of the cover at the touch sensitive area;

a selectively illuminable light source disposed near the second side of the cover;

the selectively illuminable light source surrounding the capacitance sensor;

the touch sensitive area being surrounded by the selective illuminable light source and having a property that allows at least a portion of light from the selective illuminable light source to be transmitted through a thickness of the cover;

the non-touch sensitive area not being adjacent to the selective illuminable light source so that light from the selectively illuminable light source is not transmittable through the thickness of the cover within the non-touch sensitive area;

a processor;

memory in communication with the processor;

programmed instructions stored in the memory that, when executed, cause the processor to:

receive a non-contact input from the capacitance sensor; and send an instruction to illuminate the selectively illuminable light source in response to the non-contact input;

wherein the selectively illuminable light source illuminates the feature in the capacitance reference surface;

wherein the non-contact input represents a proximity measurement that is over one millimeter away from the cover.

2. The device of claim 1, wherein the feature is at least a portion of border around at least a portion of the capacitance reference surface.

3. The device of claim 1, wherein the non-contact input represents a proximity measurement that is over one inch away from the cover.

4. The device of claim 1, wherein the non-contact input represents a user approaching the capacitance reference surface at a distance away from the capacitance reference surface without touching the capacitance reference surface.

5. The device of claim 4, wherein the distance is less than eight inches away from the capacitance reference surface.

6. The device of claim 4, wherein the distance is less than one inch away from the capacitance reference surface.

7. The device of claim 1, wherein the selectively illuminable light source is a light guide.

8. The device of claim 1, wherein the touch sensitive area is not identified in the cover when the selectively illuminable light source is not activated.

9. The device of claim 1, wherein the touch sensitive area is identified when the selectively illuminable light source is activated.

10. An electronic device, including:

a cover;

a keyboard located within the cover;

a touch sensitive area located within the cover and spaced away from the keyboard at a distance, where the touch sensitive area is unidentifiable in a non-border mode;

a first side of the cover within the touch sensitive area includes a capacitance reference surface;

a second side of the cover is opposite the first side of the cover;

a capacitance sensor disposed near the second side of the cover at the touch sensitive area;

a light guide surrounding the capacitance sensor;

a processor;

memory in communication with the processor;

programmed instructions stored in the memory that, when executed, cause the processor to:

receive a non-contact input from the capacitance sensor; and send an instruction to switch the touch sensitive area from a non-border mode to a border mode in response to the non-contact input by illuminating the light guide;

wherein the non-contact input represents a proximity measurement that is over one millimeter away from the cover.

11. A computer-program product for identifying a touch sensitive area of a user input surface, the computer-program product comprising a non-transitory computer-readable medium storing instructions executable by a processor to:

receive a user input from a sensor located adjacent a backside of a touch sensitive area of a cover; and send an instruction to illuminate a feature of light guide that surrounds the capacitance sensor and the touch sensitive area in response to the user input;

wherein the user input is a non-contact input that is spaced away from the user input surface within a range of one millimeter to 12 inches away from the touch sensitive area.

12. The computer-program product of claim 11, wherein the feature is at least a portion of a border indicating the touch sensitive area.

13. The computer-program product of claim 12, wherein the at least a portion of the border includes a continuous illuminated line.

14. The computer-program product of claim 12, wherein the at least a portion of the border includes multiple illuminated segments collectively forming the at least portion of the border.

15. The computer-program product of claim 12, wherein the at least a portion of the border includes illuminated markers located near a corner of the touch sensitive area.

16. The computer-program product of claim 11, wherein the user input is a radar input.

17. The computer-program product of claim 11, wherein the user input is an ultrasonic input.

18. The computer-program product of claim 11, wherein the user input is a capacitance input.

* * * * *